United States Patent [19]
Lawson et al.

[11] Patent Number: 5,533,273
[45] Date of Patent: Jul. 9, 1996

[54] ANGLE MILLING INDICATOR

[75] Inventors: Gerald P. Lawson; Thomas A. Ryan, both of Winona; Gary R. Puetz, Utica, all of Minn.

[73] Assignee: DCM Tech, Inc., Winona, Minn.

[21] Appl. No.: 270,955

[22] Filed: Jul. 5, 1994

[51] Int. Cl.⁶ .................................................. B23Q 17/22
[52] U.S. Cl. ................................. 33/534; 33/626; 33/640
[58] Field of Search ........................... 33/832, 833, 626, 33/630, 638, 640, 642, 534, 535

[56] References Cited

U.S. PATENT DOCUMENTS

| | | |
|---|---|---|
| 2,878,575 | 3/1959 | Ganson ................................. 33/626 X |
| 3,382,582 | 5/1968 | Matson .................................... 33/535 |
| 3,563,133 | 2/1971 | Asman et al. . |
| 3,614,909 | 10/1991 | Neuser . |
| 4,018,113 | 4/1977 | Blazenin et al. . |
| 4,376,341 | 3/1983 | Lombardo ................................. 33/642 |
| 4,626,151 | 12/1986 | Dietrich . |
| 4,826,370 | 5/1989 | Conradsson . |
| 4,881,858 | 11/1989 | Volk et al. . |
| 4,986,003 | 1/1991 | DoCarmo .............................. 33/626 X |
| 5,035,555 | 7/1991 | Ueda . |
| 5,205,046 | 4/1993 | Barnett et al. . |
| 5,207,007 | 5/1993 | Cucinotta et al. ..................... 33/626 X |
| 5,234,295 | 8/1993 | Jackson et al. . |

*Primary Examiner*—Thomas B. Will
*Attorney, Agent, or Firm*—Vidas Arrett & Steinkraus

[57] ABSTRACT

The present invention provides a convenient, efficient apparatus and method for aligning a workpiece with the cutting plane of a machine tool that is convenient and efficient. The apparatus comprises a spring-loaded device for aligning a workpiece with the cutting point of the spindle of a milling machine, which further comprises a dial indicator held in a movable block. The dial indicator is used to measure the desired difference in indicator readings between the front and back of a workpiece. To position the workpiece an operator pushes down on the indicator to contact the workpiece and slides it back and forth across the workpiece, which may be titled to obtain the desired difference in indicator reading between front and back.

16 Claims, 2 Drawing Sheets

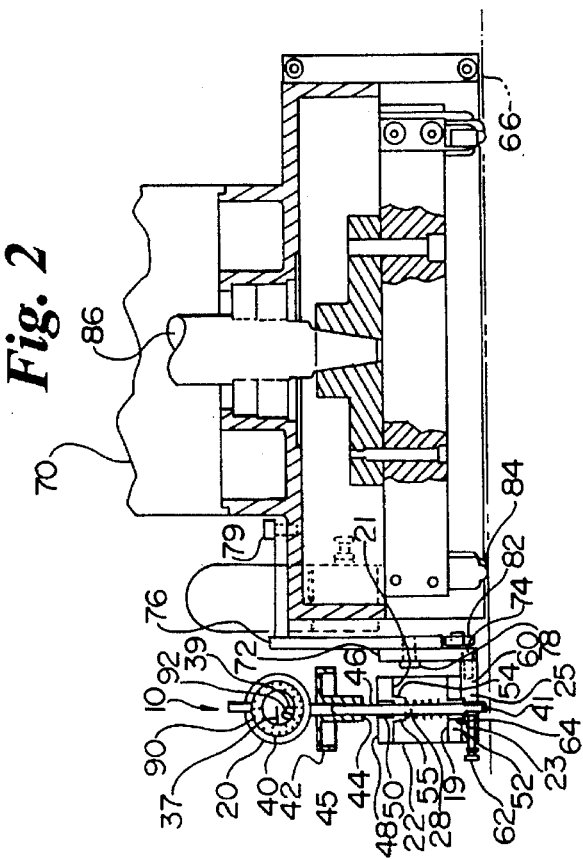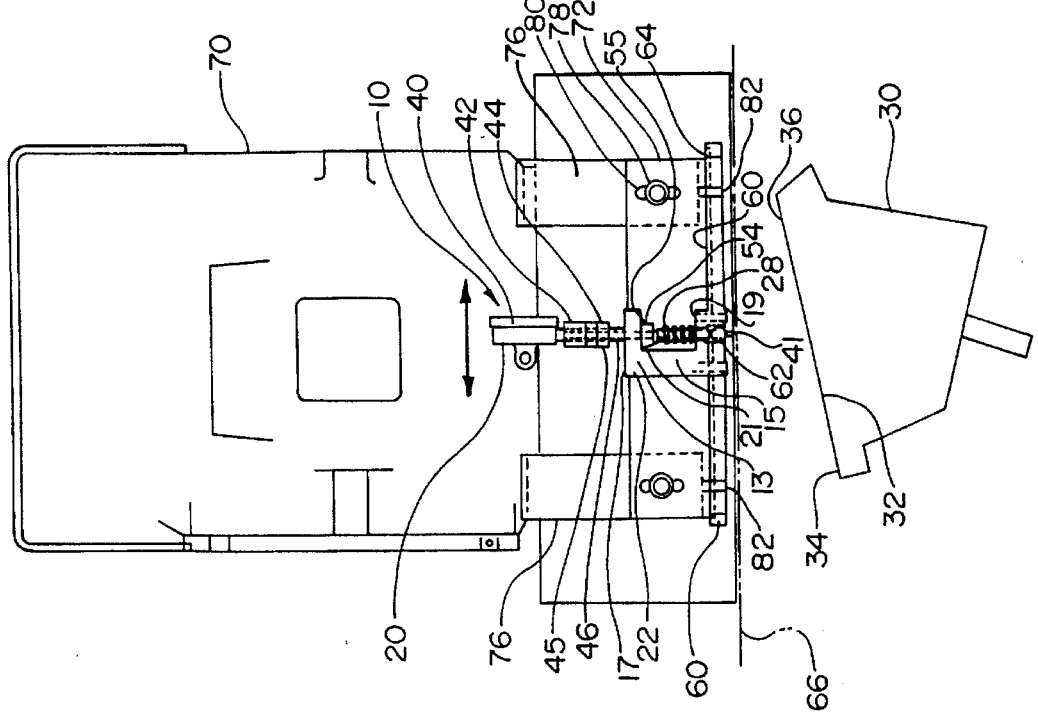

ANGLE MILLING INDICATOR

BACKGROUND OF THE INVENTION

Few devices exist for setting workpieces for use with milling machines. For example, U.S. Pat. No. 5,035,555 to Ueda relates to a device for milling machines for setting a workpiece to a position, including a workpiece backing plate and a dial, wherein the movement of the workpiece backing plate can be set to a value proportional to the setting of the dial. This reference teaches varying the cutting width relative to a workpiece and is not directed to solving the problem of angle cutting.

To date the most efficient manner of solving problems related to working in angles has been the use of spirit levels, which is inconvenient and cumbersome.

The conventional method of aligning the workpiece is to use a precision spirit level to align the workpiece to earth, the surfacer having been previously leveled via the same method. This method is quite inconvenient as the range of a precision level is quite limited and normally much less than the angle to which the workpiece is to be surfaced.

There exists a need for an apparatus which solves problems related to angle milling in a convenient, efficient manner without the need of a precision spirit level.

SUMMARY OF THE INVENTION

The present invention provides an apparatus and method for aligning a workpiece with the cutting plane of a machine tool that is convenient and efficient. The apparatus is a spring-loaded device for aligning a workpiece with the cutting plane of a milling machine. The apparatus comprises a dial indicator held in a movable block. The dial indicator is used to measure the desired difference in indicator readings between the front and back of a workpiece. To position the workpiece an operator pushes down on the indicator to contact the workpiece and slides it back and forth across the workpiece, which may be tilted to obtain the desired difference in indicator reading between front and back. This avoids the need to work in angular measurements with precision spirit levels.

BRIEF DESCRIPTION OF THE FIGURES

FIG. 1 is a side elevational diagram of an angle milling indicator according to the present invention mounted to a machine tool; and FIG. 2 is a front elevational view of the angle milling indicator;

DETAILED DESCRIPTION OF THE INVENTION

Figure 3:
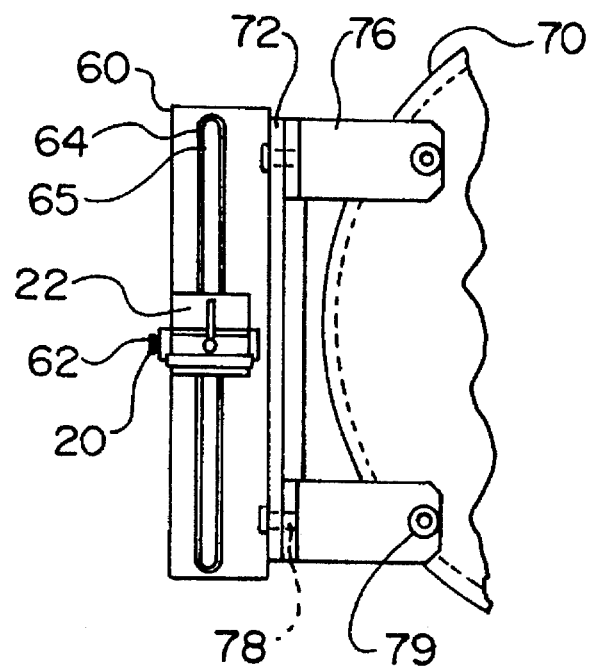
FIG. 3 is a top view of the angle milling indicator mounted to the machine tool.

While this invention may be embodied in many different forms, there are described in detail herein specific preferred embodiments of the invention. This description is an exemplification of the principles of the invention and is not intended to limit the invention to the particular embodiments illustrated.

The angle milling indicator of the present invention is suitable for use on a surfacing machine, usually a milling or grinding machine, to align a work piece with the cutting plane of the spindle. This function is particularly useful when it is desired to remove more material from one side of the workpiece than the other, commonly referred to as angle milling, but also may be applicable to uniform planing of a surface when high precision is required.

In general, the machine tool with which the inventive angle milling indicator is used has a vertical spindle with a grinding, milling or other metal removal device attached to the end of it. The cutting device is rigidly fixed to the spindle and therefore defines a plane to which the workpiece will be machined.

The inventive angle milling indicator (AMI) is designed to be mounted to the housing of a spindle motor through the use of any of several designs of brackets. Onto these brackets is attached a movable planar slide plate. This slide plate is installed and adjusted at installation to be precisely parallel to the cutting plane. Adjusting screws at the front and back of the attaching brackets provide easy, precise movement of the plate.

On the slide plate rests a movable dial indicator base with a dial indicator installed into it. The dial indicator is spring loaded to hold it above the workpiece when not in use. The operator pushes down on the indicator handle to bring it down to the adjustable stop which has been preset to stop the indicator at a convenient depth below the cutting plane. This distance may correspond to one revolution of the needle around the outside dial of the dial indicator face plate, or may alternatively correspond to ½ or 2 revolutions. Any uniform revolution may be adopted and consistently used. In use, when the indicator tip is raised a vertical distance which corresponds to one revolution of the needle around the outside dial, the indicator tip will be at the cutting plane.

The indicator/base assembly is able to be slid forward and backward across the surface of the workpiece. The workpiece is then tilted an appropriate amount to align it to the plane of the cutter. When it is desired to remove more material off one side of the workpiece than the other side, the workpiece is tilted until the AMI indicates this amount when traversed from front to back or vice versa. The operator then releases the indicator allowing it to rise up out of the way of the moving workpiece.

Referring to FIGS. 1 and 2, the angle milling indicator of the present invention is shown generally at 10. Angle milling indicator 10 comprises spring loaded dial indicator 20 mounted in movable dial indicator base 22. Dial indicator 20 is spring loaded into movable base by means of compression spring 28 to hold it above workpiece 30 when the actual cutting is occurring. Workpiece 30 has a surface 32 with front and rear portions 34,36.

Dial indicator face plate 40 is fixed to modified handle 42 by any suitable means. A two-part epoxy may be used to attach modified handle 42 to dial indicator 20. An example of a suitable two-part epoxy is Devcon® 14300, commercially available from Devcon Company of Danverse, Mass. Needles 37, 39 is in communication with spring loaded indicator tip 41 which extends downwardly from dial indicator 20. Needles 37, 39 on dial indicator face plate 40 translate the movement of indicator tip 41 by a rack and pinion mechanism well known in the art. The indicator means may alternatively be digital or electronic.

Dial indicator face plate 40 has two dials. The exterior dial 90 is calibrated so that each dial unit thereof is 0.001". An interior dial 92 is calibrated from 0 to 0.500. Where the range of measurement of dial indicator 20 is from 0.00" to 0.500", the exterior dial needle 37 will make five revolutions, and the interior dial needle 39 will revolve once from 0.000" to 0.500".

Adjustable down stop 44 is located below modified handle 42, and is adjustably mounted on stem 46 which extends downward from gauge 40 and modified handle 42. Indicator rod (not shown) extends through stem 46 and terminates in indicator tip 41. Indicator tip 41 is spring loaded in dial indicator 20, and can move independently of stem 46 in which it is housed. Indicator tip 41 is retained with dial indicator 20 above the cutting plane when not in use.

Adjustable stop 44 is preset to stop dial indicator 20 at a convenient depth below the cutting plane which corresponds to a predetermined number of revolutions of needle 37 around the exterior dial 90 of dial indicator face plate 40. Although any number or fraction of revolutions may be adopted, in the most preferred embodiment, the depth corresponds to one revolution of needle 37 around exterior dial 90. In use, when indicator tip 41 is raised a vertical distance which corresponds to one revolution of needle 37 around exterior dial 90, indicator tip 41 will be at the level of cutting plane 66.

Figure 4:
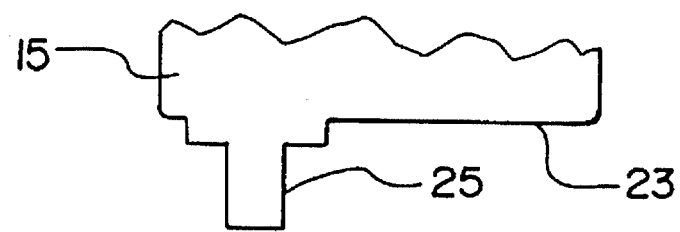
FIG. 4 is a side view of the lower portion of the movable base of the angle milling indicator.

Dial indicator 20 is slidably held in movable base 22. As shown in FIG. 1, movable base 22 is generally C-shaped and has an upper portion 13 having upper and lower surfaces 17,21, and a lower portion 15 having upper and lower surfaces 19,23. Upper through bore 50 is positioned axially above lower through bore 52, so that through bores are positioned coaxially. Stepped guide 25 extends downwardly from lower surface 23, as best seen in FIG. 4. Stem 46 of dial indicator 20 extends through upper through bore 50 and lower through bore 52 of movable base 22. Compression spring 28 is held between lower surface 21 of upper portion 13 of base 22, and upper surface 19 of lower portion 15 of base 22. Spring stop 54 is fixed to stem 46 between compression spring 28 and upper through bore 50 by suitable means such as a set screw 55, and functions to retain both spring 28 and stem 46 in place in movable base 22, which prevents dial indicator 20 from being removed from base 22.

Spring stop 54 is analogous in structure to adjustable down stop 44. The diameter of both adjustable down stop 44 and spring stop 54 is greater than the interior diameter of upper through bore 50. In use, adjustable down stop 44 thereby prevents dial indicator 20 from being depressed to a point lower than upper surface 17 and spring stop 54 limits upward movement of dial indicator 20 by limiting the movement of spring 28 beyond lower surface 21. In use, when dial indicator 20 is depressed, indicator rod and indicator tip 41 thereof will extend downwardly through lower through bore 52 and contact surface 32 of workpiece 30, thereby providing a reading on indicator face plate 40. Stem 46, to which stops 44 and 54 are attached, is spring loaded in movable base 22.

Adjustable down stop 44 is tightened in position around stem 46 by suitable means such as a set screw 45, so that in use, down stop 44 will meet upper surface 17 of movable base 22 when dial indicator 20 is depressed.

Prior to use, dial indicator 20 is calibrated by setting down stop 44 so that needles 37, 39 of face plate 40 is set at a desired number of revolutions when indicator tip 41 is level with cutting plane 66. Down stop 44 will meet upper surface 17 of movable base 22 when dial indicator 20 is depressed. Down stop 44 is preset so that when down stop 44 meets upper surface 17, indicator tip 41 descends to a convenient depth below the cutting plane which corresponds in the most preferred embodiment to one revolution of needle 37 around exterior dial 90 of dial indicator face plate 40, although the depth may correspond to any number of revolutions desired. In use, when indicator tip 41 is raised a vertical distance which corresponds to one revolution of needle 37 around exterior dial 90, indicator tip 41 will be at the level of cutting plane 66.

Referring now to FIG. 3, dial indicator base 22 is mounted to grooved slide plate 60 by means of bolt 62. Slide plate 60 includes a stepped groove 64, stepped groove 64 being constructed and arranged to mate with stepped guide 25 so that base 22 slides back and forth along stepped groove 64. Movable base 22 rests on and slides along step 65. In use, indicator tip 41 extends through groove 64. Groove 64 may be of any length less that of slide plate 60. Slide plate 60 is installed and adjusted to be precisely parallel to cutting plane 66, so that slide plate 60 and groove 64 thereon are always precisely parallel to cutting plane 66.

Slide plate 60 is mounted to upright plate 72 by means of fasteners 74. Upright plate 72 is adjustably mounted to mounting arms 76 by fastening means 78. Mounting arms 76 are retained on machine tool 70 by means of fastening means 79.

The height of upright plate 72 and thusly the height of slide plate 60 are adjustable by means of slots 80 in mounting arms 74. Fastening means 78 extending through slots 80 mounting arms 76 are loosened to allow upright plate to be moved along slots 80 and retightened when upright plate 72 is at the desired height on mounting arms 76. This adjustment in slots 80 is generally only effected when machine tool 70 is installed and prior to operation thereof. Readjustment is usually only necessary when upright plate 72 is inadvertently moved in slots 80. Adjustable upright set screws 82 abut mounting arms 76 and serve to reinforce the adjusted position of upright plate 72. Although any suitable set screw may be used, the most preferred is a nylock set screw which is used to prevent movement due to vibration. Cutting tool 84 is rigidly mounted to machine tool 70 at vertical spindle 86 thereof.

In use, workpiece 30 is mounted on machine tool 70 and rigidly held thereon. Then the workhead or spindle 86 is lowered, or alternatively workpiece 30 is raised until workpiece 30 contacts indicator tip 41 of dial indicator 20. The operator of angle milling indicator 10 pushes down on modified handle 42, depressing dial indicator 20.

Dial indicator 20 is depressed until down stop 44 meets upper surface 17 of movable base 22. Indicator tip 41 is constructed and arranged to move up and down along surface 32 of workpiece 30 while stop 44 is in abutting relationship with upper surface 17 of base 22. When dial indicator 20 is depressed against adjustable down stop 44, spring loaded indicator tip 41 will extend through groove 64 of slide plate 60 to the surface 32 of workpiece 30.

The operator slides movable base 22 back and forth in groove 64 of slide plate 60. As this occurs, dial indicator 20 slides back and forth, indicator tip 41 thereof extending through groove 64 and contacting surface 32 of workpiece 30. Needle 39 of gauge 40 is in communication with spring loaded indicator tip 41 and translates the movement of indicator tip 41 to provide a reading on dial indicator gauge 40 in response to the position of indicator tip 41. A reading is taken on dial indicator 20 at rear 36 of workpiece 30. Dial indicator 20 is then slid forward until it is at front 34 of workpiece 30 and a second reading is taken.

The difference in the measurements between front and rear 34,36 of surface 32 may thereby be determined. Workpiece 30 is then tilted an appropriate amount to align it to cutting plane 66, or until the desired difference in indicator readings between front 34 and rear 36 is obtained, when it is desired to cut the workpiece 30 at an angle with respect its surface 32.

The angularity to which a workpiece is to be surfaced is generally specified in terms such as 0 to 0.100", although the dial face could be changed to accommodate any desired scale or unit of measurement. Indicators are available having differing gauges which provide different amounts of travel of the needle from 1 to 5 or even 10 revolutions. The most preferred face is one which provides clockwise readings from 1 to 100 units.

In the most preferred embodiment, dial indicator gauge 40 is set so that the needle will revolve one complete revolution until it reaches the point which indicates the cutting plane. Dial indicator 20 is thereby calibrated so that indicator tip 41 will be one revolution below cutting plane 66 when you depress or preload dial indicator 20. When released, dial indicator 20 will rise above cutting plane 66 so that it is out of the way when cutting is effected.

With a dial indicator gauge which measures from 0.000"–0.005", for example, a reading taken at 0.090" will actually be 0.010" below cutting plane 66, which is preloaded at a level corresponding to 0.100" on dial indicator 20. A dial indicator reading of 0.110 would indicate a reading taken 0.010" above the cutting plane. When the dial indicator reading is 0.110, the amount cut by the cutting tool will be 0.010 units, the amount measured above the cutting plane. In essence, at a preload of 0.100 units, any dial indicator reading over 0.100 units, designated as X, will be X -0.100 units above the cutting plane, and the cutting tool will remove X -0.100 units from the surface of a workpiece in that position.

To machine off a predetermined vertical height Z of material from the rear end 36 of workpiece 30 relative to the front end 34, dial indicator 20 is moved back and forth so that indicator tip 41 contacts the surface of the front end 34 of workpiece 30 such that the first position of the indicator tip reads $R_1$. Workpiece 30 is then tilted so that its rear end 36 is above cutting plane 66. Dial indicator 20 is then moved to the rear 36 so that indicator tip 41 is above the surface of rear end 36 of workpiece 30. The height $R_2$ of the rear end 36 workpiece 30 is then measured relative to the cutting plane 66. The workpiece is then adjusted so that the difference between $R_2$ and $R_1$ the is equal to the predetermined vertical height Z between the front and back ends of the workpiece, such that $R_2 - R_1 = Z$.

Surface 32 of workpiece 30 may also be uniformly planed by making a parallel cut, i.e. cutting an equal amount from the entire surface 32 of workpiece 30. If a parallel cut is desired, workpiece 30 is then tilted until both readings are equal. Adjustment for parallel cutting can be at any number as the readings will be the same. One would need only to place the workpiece so that the measured amount to be removed is equal to the distance of the workpiece above cutting plane 66.

Use of the device of the present invention gives the operator the convenience of using this specification directly without conversion to an angle measurement in degrees or placing a spacer under one end of a spirit level. If an actual angle measurement is given when specifying the cut, however, the operator need only measure the width of the workpiece and calculate the indicator reading differential using elementary trigonometry as set forth in the following example. For an 8" wide workpiece to be cut at 1°, one calculates 8"× tan 1° =0.140. In this case the difference between the indicator reading at the rear 34 and the front 36 should be 0.140. The resulting cut will be at 1°.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. An apparatus for aligning a workpiece with a stationary cutting plane of a machine tool, the apparatus being mounted to the machine tool and further comprising:

a) a planar grooved slide plate having a groove, the slide plate being mounted to the machine tool such that the slide plate is parallel to the cutting plane;

b) mounting means for adjustably mounting the slide plate to the machine tool, said mounting means comprising a pair of mounting brackets;

c) a movable base connected to the machine tool by the slide plate; and d) a spring-loaded dial indicator having an indicator rod extending therefrom and terminating in an indicator tip, and an indicating means in communication with said indicator rod, said dial indicator being mounted in the movable base and perpendicular to the cutting plane, said spring-loaded dial indicator being depressable to contact the workpiece positioned therebeneath; whereby the movable base may be moved back and forth in the groove of the slide plate across the workpiece from a front end of the workpiece to a rear end of the workpiece and a reading of the dial indicator may be taken at each end of the workpiece in response to movement of the indicator rod, to align the workpiece to the stationary cutting plane of the machine tool by reference to the dial indicator.

2. An apparatus for aligning a workpiece with a cutting plane of a machine tool, the apparatus comprising:

a) a movable planar grooved slide having a stepped groove;

b) a generally C-shaped movable base further comprising:
      i) an upper portion having an upper surface and a lower surface, and a lower portion having an upper surface and a lower surface;
      ii) a stepped guide extending downwardly from said lower surface of the lower portion, said stepped guide being constructed and arranged to slidably mate with the groove of the slide plate for movement back and forth therein;

c) a spring-loaded dial indicator having an indicator rod extending therefrom and terminating in an indicator tip, and an indicating means in communication with said indicator rod, said dial indicator being held in the movable base and further comprising an upper portion, a lower portion defining a stem through which the indicator rod extends, and a modified handle to which the upper portion is attached, the indicator tip of the dial indicator being longitudinally extensible through the groove;

d) an upper through bore extending through the upper portion of the movable base and a lower through bore extending through the lower portion of the movable base, for slidably receiving the stem of the dial indicator, the stem extending therebetween;

e) a compression spring through which the stem extends, said compression spring being located between the lower surface of the upper portion of the base and the upper surface of the lower portion of the base, said compression spring being constructed and arranged to spring load the stem of the dial indicator and hold the dial indicator above the workpiece when the modified handle is not depressed; and f) a collar mounted to the stem between the compression spring and the lower surface of the upper portion of the base, said collar having a greater diameter than the upper through bore and being tightened around said stem by means of a set screw, thereby retaining both the compression spring and the stem of the dial indicator in place in the movable base;

whereby the movable base may be moved back and forth across the workpiece from a front end of the workpiece to a rear end of the workpiece and a reading of the dial indicator may be taken at each of the workpiece in response to movement of the indicator rod, to align the workpiece to the cutting plane of the machine tool by reference to the dial indicator.

3. The apparatus of claim 2 further comprising:
   a) a pair of spaced mounting arms, each mounting arm being constructed and arranged to be mounted to the housing of a spindle motor by means of a mounting bracket, each of said mounting arms having an upper portion extending generally horizontally and a lower portion extending generally vertically and being angularly disposed relative to the upper portion;
   b) an upright plate extending across and being vertically adjustably mounted to the lower portion of the pair of mounting arms, said upright plate being vertically adjustable by means of slots thereon, said movable planar grooved slide plate being mounted to said upright plate, whereby the slide plate is vertically adjustable and the apparatus may thereby be precisely adjusted to a cutting plane.

4. The apparatus of claim 3 which is mounted to a housing of a spindle motor having a cutting tool rigidly fixed thereto.

5. The apparatus of claim 4 wherein the slide plate is parallel to a cutting plane of the cutting tool.

6. A method of aligning a workpiece with a stationary cutting plane of a machine tool, the method comprising the steps of:
   a) providing a workpiece having a surface with a front portion and a rear portion;
   b) providing an apparatus which is mounted on the machine tool, said apparatus comprising a planar slide plate having a groove, the slide plate being adjustably mounted to the machine tool such that the slide plate is parallel to the cutting plane by a pair of mounting brackets, and a movable base with a dial indicator spring loaded therein and being perpendicular to the cutting plane, the movable base being connected to the machine tool by the slide plate;
   c) positioning the workpiece by
      i) depressing the dial indicator to contact the workpiece;
      ii) sliding the dial indicator back and forth across the surface of the workpiece by moving the base along the groove of the slide plate;
      iii) taking a reading of the dial indicator at the front portion and at the rear portion of the surface of the workpiece, noting the difference between indicator readings of the front and rear portions of the surface;
      iv) tilting the workpiece to obtain the desired difference between indicator readings of the front portion and rear portion of the workpiece;

whereby the workpiece is aligned with the stationary cutting plane of the machine tool, by adjusting the workpiece.

7. A method of aligning a workpiece with a cutting plane of a machine tool, the method comprising the steps of:
   a) providing a workpiece having a surface with a front portion and a rear portion;
   b) providing an apparatus comprising a planar grooved slide plate, a movable base with a dial indicator spring-loaded therein, the dial indicator further comprising an upper portion having an indicator rod extending therefrom and terminating in an indicator tip, an indicating means in communication with said indicator rod, a modified handle to which the upper portion is attached, and a lower portion defining a cylindrical stem through which the indicator rod extends, and wherein the movable base is generally C-shaped and further comprises:
      i) an upper portion having an upper surface and a lower surface, and a lower portion having an upper surface and a lower surface;
      ii) a stepped guide extending downwardly from said lower surface of the lower portion, said stepped guide being constructed and arranged to slidably mate with the groove of the slide plate for movement back and forth therein, the indicator tip of the dial indicator being longitudinally extensible through the groove;
      iii) an upper through bore extending through the upper portion of the movable base and a lower through bore extending through the lower portion of the movable base, for slidably receiving the stem of the dial indicator, the stem extending therebetween;
      iv) a compression spring through which the stem extends, said compression spring being located between the lower surface of the upper portion of the base and the upper surface of the lower portion of the base, said compression spring being constructed and arranged to spring-load the stem of the dial indicator and hold the dial indicator above the workpiece when the modified handle is not depressed; and
      v) a collar mounted to the stem between the compression spring and the lower surface of the upper portion of the base, said collar having a greater diameter than the upper through bore and thereby retaining both the compression spring and the stem of the dial indicator in place in the movable base;
   c) positioning the workpiece by
      i) depressing the dial indicator by depressing the modified handle so that the dial indicator contacts the workpiece;
      ii) sliding the dial indicator back and forth across the surface of the workpiece, said movement of the dial indicator across the workpiece being effected through movement of the movable base along the slide plate;
      iii) taking a reading of the dial indicator at the front portion and at the rear portion of the surface of the workpiece, noting the difference between indicator readings of the front and rear portions of the surface;
      iv) tilting the workpiece to obtain the desired difference between indicator readings of the front portion and rear portion of the workpiece;

whereby the workpiece is aligned with the cutting plane of the machine tool.

8. The method of claim 7 wherein the apparatus further comprises:
   a) a pair of spaced mounting arms, each mounting arm being constructed and arranged to be mounted to the housing of the machine tool by means of a mounting bracket, each of said mounting arms having an upper portion extending generally horizontally and a lower portion extending generally vertically and being angularly disposed relative to the upper portion;

b) an upright plate extending across and being vertically adjustably mounted to the lower portion of the pair of mounting arms, said upright plate being vertically adjustable by means of slots thereon, said movable planar grooved slide plate being mounted to said upright plate, whereby the slide plate is vertically adjustable and the apparatus may thereby be precisely adjusted to a cutting plane.

9. The method of claim 8 wherein the slide plate of the apparatus is adjusted to be parallel to a cutting plane of the cutting tool.

10. An apparatus for positioning a workpiece relative to a stationary cutting plane of a machine tool, the apparatus being mounted to the machine tool and further comprising:

a) planar slide plate having a groove, the slide plate being mounted to the machine tool such that the slide plate is parallel to the cutting plane;

b) a pair of mounting brackets for adjustably mounting the slide plate to the machine tool;

c) a base which is connected to the machine tool by the slide plate such that the base can axially along the groove of the slide plate in a path which is parallel to the cutting plane, and d) a spring-loaded indicator comprising a measurement means connected to an elongate indicator rod which terminates in an indicator tip, the indicator being mounted in the base such that the elongate indicator rod is perpendicular to the cutting plane, said spring-loaded indicator being depressable to contact the workpiece positioned therebeneath, and where the indicator tip moves axially between a first position and a second position, the first position being at the cutting plane and the second position being a predetermined distance above the cutting plane, and where the measurement means measures the axial distance traversed by the indicator tip between the first and second position, whereby the workpiece may be positioned such that a predetermined portion of the workpiece as defined by the axial distance measured between the first and second position is above the cutting plane of the machine tool for subsequent removal.

11. The apparatus of claim 10 wherein the workpiece has a front portion and a rear portion and the workpiece is tilted relative to the cutting plane so that more material will be removed from one portion than the other.

12. The apparatus of claim 10 wherein the measurement means is a dial indicator.

13. The apparatus of claim 10 wherein the measurement means is an electronic measurement means.

14. An apparatus for positioning a workpiece relative to a stationary cutting plane of a machine tool, the apparatus being mounted to the machine tool and further comprising:

a) a base which is connected to the machine tool using a slotted plate which is connected to the machine tool such that the slotted plate is parallel to the cutting plane, the base including a guide which extends into the slot of the plate such that the base can slide axially along the slot in a path which is parallel to the cutting plane, and b) a spring-loaded indicator comprising a measurement means connected to an elongate indicator rod which terminates in an indicator tip, the indicator being mounted in the base such that the elongate indicator rod is perpendicular to the cutting plane, said spring-loaded indicator being depressable to contact the workpiece positioned therebeneath, and where the indicator tip moves axially between a first position and a second position, the first position being at the cutting plane and the second position being a predetermined distance above the cutting plane, and where the measurement means measures the axial distance traversed by the indicator tip between the first and second positions, whereby the workpiece may be positioned such that a predetermined portion of the workpiece as defined by the axial distance measured between the first and second position is above the cutting plane of the machine tool for subsequent removal.

15. A method of positioning a workpiece relative to the stationary cutting plane of a machine tool, comprising the steps of:

providing a measurement device comprising:
   a) a planar grooved slide plate having a stepped groove;
   b) mounting means for adjustably mounting the slide plate to the machine tool, said mounting means comprising a pair of mounting brackets;
   c) a base which is mounted to the machine tool such that the base can slide axially along the groove of the slide plate in a path which is parallel to the cutting plane,
   d) an indicator comprising a measurement means connected to an elongate indicator rod which terminates in an indicator tip, the indicator being mounted in the base such that the elongate indicator rod is perpendicular to the cutting plane, and where the indicator rod tip moves axially between a first position and a second position, the first position being at the cutting plane and the second position being a predetermined distance above the cutting plane, and where the measurement means measures the vertical distance traversed by the indicator rod top between the first and second positions, aligning the workpiece relative to the machine tool such that a predetermined portion of the workpiece is above the stationary cutting plane of the machine tool, where the vertical height of the predetermined portion is determined using the measurement device, and removing the portion of the workpiece above the cutting plane.

16. The method of claim 15 wherein a predetermined vertical height (Z) of material may be machined off a back end of the workpiece relative to a from end of the workpiece, and further comprising the steps of:

sliding the measurement device so that the elongate indicator rod tip contacts the surface of the front end of the workpiece such that the first position of the indicator tip reads $R_1$;

tilting the workpiece so that the back end of the workpiece is above the cutting plane;

sliding the measurement device so the elongate indicator rod tip is above the surface of the back end of the workpiece;

measuring the height of the back end of the workpiece relative to the cutting plane ($R_2$), and adjusting the tilt of the workpiece so that difference between $R_2$ and $R_1$ is equal to the predetermined vertical height between the front and back ends of the workpiece, such that $R_2 - R_1 = Z$.

* * * * *

UNITED STATES PATENT AND TRADEMARK OFFICE
CERTIFICATE OF CORRECTION

PATENT NO. : 5,533,273
DATED : July 9, 1996
INVENTOR(S) : Gerald P. Lawson; Thomas A. Ryan; Gary R. Puetz It is certified that error appears in the above-identified patent and that said Letters Patent is hereby corrected as shown below:

Column 10, line 49, delete "from" and insert therefor
-- front --.

Signed and Sealed this

Fifth Day of November, 1996

Attest:

BRUCE LEHMAN

Attesting Officer

Commissioner of Patents and Trademarks